March 21, 1939.  R. H. DICKE  2,151,317
CLOCK SYSTEM
Filed Sept. 4, 1935
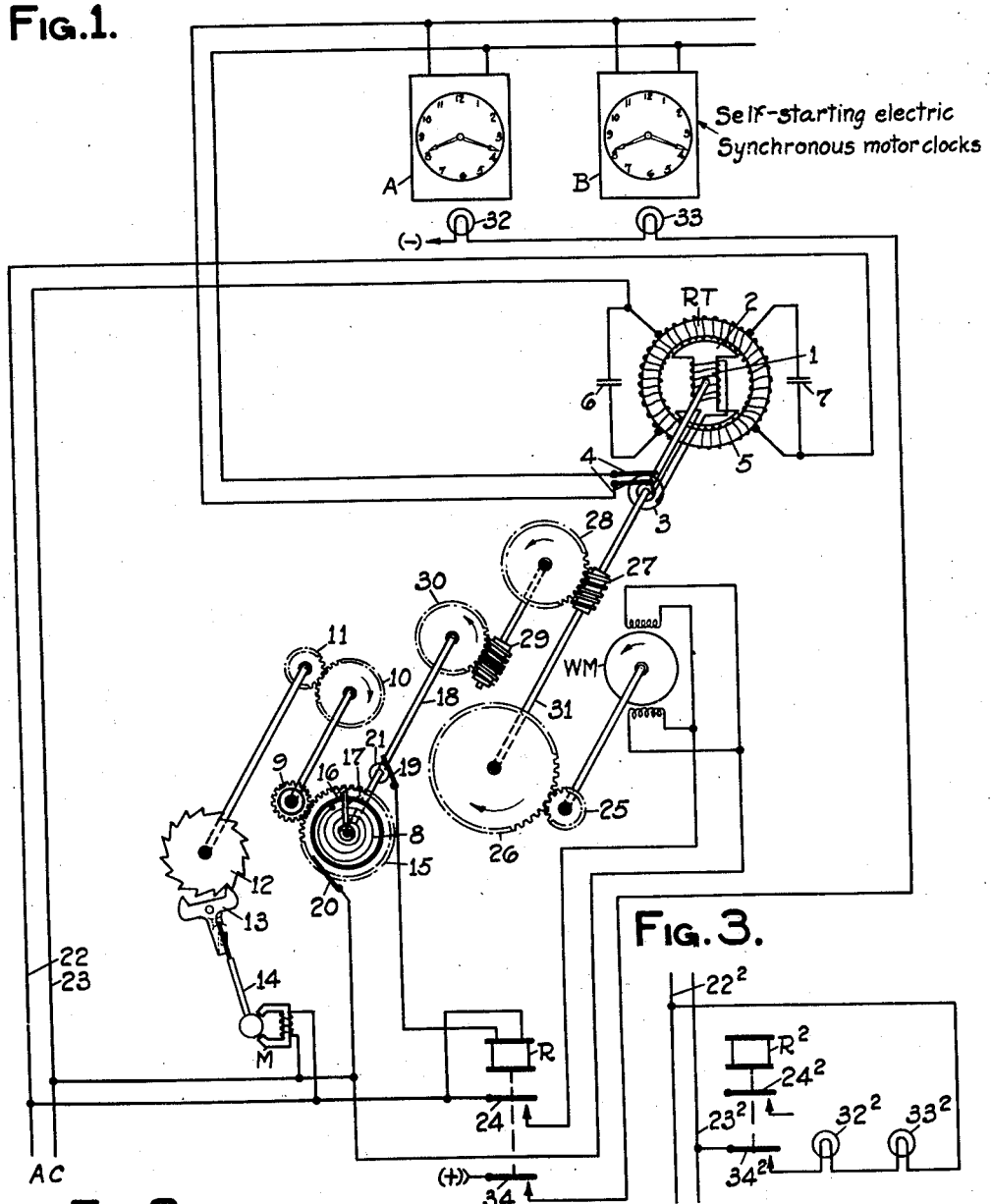
FIG.1.
FIG.3.
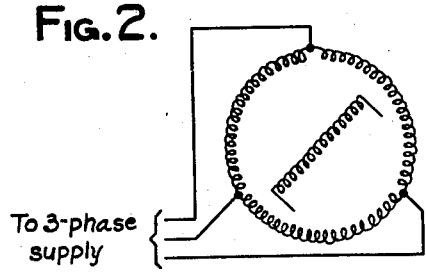
FIG.2.
INVENTOR
Robert H. Dicke Patented Mar. 21, 1939

2,151,317

UNITED STATES PATENT OFFICE 2,151,317

CLOCK SYSTEM

Robert H. Dicke, Rochester, N. Y.

Application September 4, 1935, Serial No. 39,146

24 Claims. (Cl. 58—35)

This invention relates to means for correcting errors arising in self-starting synchronous motor clock systems due to power failures, and more particularly to a system wherein a plurality of electric clocks are corrected by the same correcting means.

As is well known, power failures in the commercial light and power systems are usually due to the cutting out of one particular branch of the system, due to lightning or some other cause, and consequently it would be impossible to correct the clocks by increasing the frequency of the generated current at the central station. This invention proposes to provide means in a branch or sub-branch of the light and power system for adding cycles to the generated current for the necessary length of time to correct the secondary clocks. This device is preferably automatically controlled, and is so shown, but it may be manually controlled if desired.

More specifically it is proposed to employ a rotary transformer, of the type in which the secondary winding is axially movable in a rotating magnetic field, for the purpose of increasing the generated frequency. This rotary transformer is proposed to be driven by an electric motor thus increasing the frequency of the current the necessary amount to correct the secondary clocks, this amount being determined by a mechanical clock which runs only during power failure or cessation.

Other objects, purposes, and characteristic features of the invention will in part be pointed out in the description and will in part be obvious from the accompanying drawing in which:

Fig. 1 is a schematic showing of the clock system to be described.

Fig. 2 is a diagrammatic representation of the way rotary transformer RT would be connected for operation from three phase alternating current.

Fig. 3 is a diagrammatic showing of the way in which signal lights 32², 33², indicating when the clocks are being corrected, could be energized by current derived directly from the light and power system.

Referring to Fig. 1 of the drawing the self starting synchronous motor electric clocks A and B are energized by alternating current derived from the secondary winding I contained on a rotor 2 of a rotary transformer RT, this current being conducted through slip rings 3 and brushes 4. The stator 5 of this rotary transformer RT may be of any suitable construction capable of producing a rotating magnetic field, but is preferably of the Gramme ring type. As shown this stator 5 is energized directly from the commercial alternating current power system, and is connected for two phase operation, one phase connection of the stator being directly connected to the alternating current power system and the other phase connection being connected to the same system through condensers 6 and 7. Since the rotor 2 is contained in a rotating magnetic field its winding I will have an alternating current voltage induced therein for any position assumed by the rotor. It is obvious that the frequency induced in this secondary winding is equal to the frequency of the current applied to the stator winding when the rotor is at rest and will be equal to the sum or difference of the respective frequencies of the magnetic field and rotor, depending on their relative direction of rotation, and that if the rotor is rotated in a direction opposite to that of the rotating magnetic field the frequency of the current applied to the clocks A and B is equal to the frequency of the current supplied by the commercial power system plus the revolutions per second of the rotor for a two pole structure.

In accordance with the present invention, as will presently appear, it is proposed to rotate the rotor 2 after each power failure, or cessation, to an extent to add a surplus of cycles sufficient to bring the clocks A and B, which of course were stopped during such cessation, back to a correct time indicating condition.

This addition of surplus cycles to the clock circuit is accomplished by employing a mechanical escapement clock 8—14 which operates only during cessation of current and the provision of means for automatically rewinding this escapement clock after each power cessation to an extent corresponding to the cessation and in driving the rotor of the rotary transformer RT by this same winding motor WM.

This escapement clock is of the usual construction, and comprises the usual main spring 8 driving clock train 9, 10, 11 and escapement wheel 12, an operating pallet 13, a suitable balance wheel or pendulum type escapement for convenience being shown including a pendulum 14. This pendulum is normally held in an extreme, at rest position by magnet M connected to the same power distribution system. This magnet M is constructed to release the pendulum 14 at the voltage at which clocks A and B stop.

The gear 15 is composed of two parts insulated from each other, the outer ring containing contact 16 and the inner disk containing main spring 8. Contact arm 17 is fixed on shaft 18, and the contact post 16 and contact arm 17, through the medium of brushes 19 and 20 and slip ring 21, connect the relay R to the supply conductors 22 and 23.

The contacts 16 and 17 are so constructed that they are only closed when the main spring 8 is fully wound, and the relay R is connected to the power distribution system through the medium of these contacts so that the relay R is deenergized whenever the main spring 8 is not fully wound. This control-relay R, when deenergized, energizes the winding motor WM through the following circuit: beginning at the supply conductor 22, through the back contact 24 of relay R, to the winding motor WM, and from there to the conductor 23.

This winding motor WM, when energized by the circuit just traced, rewinds the main spring through the medium of rewind gears and worms 25, 26, 27, 28, 29 and 30, and when the main spring 8 is fully wound the contacts 16, 17 close the energizing circuit for the control relay R and break the energizing circuit for winding motor WM at the back contact 24 of this relay R. Since the rotor 2 is directly connected to gear 26, rotor 2 will be operated to an extent depending on the extent of rewinding of the main spring 8. The gear ratio between the shaft 31 containing rotor 2 and the escapement wheel 12 is such that each second of operation of the escapement wheel, resulting in dissipation of energy from the main spring 8, will require an amount of rewinding equal to 60 revolutions of the shaft 31. Gear 9 is, as shown, insulated from its shaft in order to effectually insulate gear 15 from its shaft.

Relay R also controls signal lights 32 and 33 which are located at or form part of the secondary clocks A and B. Whenever relay R is deenergized, contacts 34 connect lights 32 and 33 to a storage battery (not shown) but represented by the plus and minus signs (+) and (−). Thus it is seen that the lights 32 and 33 are energized whenever the clocks A and B are not indicating correct time.

Fig. 3 shows a modified form of this signal light system. Instead of being supplied by current from a battery the lights 32² and 33² controlled by contact 34² of a relay R² are connected to the alternating current supply system. In this form of the invention the lights would indicate only when the clocks are being corrected. Inasmuch as in practice clocks A and B are preferably provided with second hands or other animation manifesting means, the stationary condition of these hands, or means, would indicate when the clocks are stopped.

Operation.—Let us assume that the commercial power system 22, 23 illustrated in the drawing supplies 60 cycle alternating current and the clocks A and B which are of the self-starting synchronous motor type, such as disclosed in the prior application of O. H. Dicke Ser. No. 714,379, correctly indicate the time of day. Let us now assume that due to a failure of the power system there is a complete cessation of alternating current for one minute and that thereafter alternating current of 60 cycles is again available. During this one minute cessation of alternating current the pendulum 14 was free of extraneous magnetic forces and therefore allowed operation of the mechanical escapement clock during this time. This operation of the escapement clock caused the contacts 16, 17 to open, so that on the return of alternating current the relay R remained deenergized. With relay R deenergized the winding motor WM is connected to the power system, as a result of which it is operated and rewinds the main spring 8 to a point at which the contacts 16, 17 are closed. Since the escapement clock operated for exactly one minute the main spring has run down to a predetermined extent and was, as just explained, wound to that same extent, and the gear ratio of the winding mechanism is such that the shaft 31 thereof connected directly to the rotor 2 had to be rotated through 3600 revolutions to rewind the main spring to said extent. During this rewinding operation the alternating current supplied to clocks A and B is equal to the frequency of the power system plus the revolutions per second of the rotor 2 during the rewinding operation. In order to avoid too great a variation in the frequency applied to clocks A and B it is proposed to rotate the rotor 2 of the rotary transformer RT at a comparatively low speed, of say 12 revolutions per second, so that the frequency applied to the clocks A and B is approximately 72 cycles per second during the rewinding operation, and with such construction, for a one minute power cessation the rewinding operation would continue for approximately 5 minutes. It is of course understood that the applicant does not wish to limit the speed of rotor 2 to any fixed value and that his invention is operable no matter what the speed of the rotor 2 is.

The system shown in Fig. 1 is intended to be employed where only single phase current is available and where the number of clocks is comparatively small. In the application of the invention to large offices, hotels, schools, communities, etc., where polyphase alternating current is usually available and the number of clocks to be controlled runs into the hundreds, it is proposed to employ a three phase stator for the rotary transformer RT as conventionally illustrated in Fig. 2 of the drawing.

Applicant has thus shown rather conventionally and described rather specifically one arrangement of apparatus whereby the principle of automatic electric clock control may be carried out, and it is desired to be understood that the particular form of the invention illustrated and described has been selected for the purpose of facilitating description of the invention and its mode of operation, and not necessarily as the construction preferably employed in practicing the invention, and that various changes, modifications and additions may be made to adapt the invention to the particular problem encountered in practicing the same, all without departing from the spirit and scope of the invention except as demanded by the scope of the following claims.

What I claim as new is:—

1. In combination; a source of single phase alternating current having its frequency regulated to deliver a predetermined number of cycles per unit of time; a rotary transformer comprising, a stator, means energized from said source of single phase alternating current to produce a rotating magnetic field in said stator, and a rotor containing a secondary winding magnetically associated with said stator so that the frequency induced in said secondary winding is equal to the sum of the frequency of said alternating current and the revolutions per second of said rotor when rotating in a particular direction; an electric clock comprising, a self-starting synchronous motor, time indicating means driven by said self-starting synchronous motor and connected to the secondary winding of said rotary transformer; and means including a time measuring device operable only during the duration of power cessation, said means being effective after each power cessation to rotate said rotor in said particular direction an extent depending on the duration of said power cessation.

2. A system for causing electrically driven time indication means to indicate correct time comprising, a source of alternating current having its frequency regulated to deliver a predetermined number of cycles per unit of time, an electric clock including time indicating means and a self-starting synchronous motor driving the same, a rotary transformer comprising a primary winding and a secondary winding magnetically coupled and relatively movable with respect to each other, so that the frequency of the secondary winding is equal to the sum of the frequency applied to the primary winding and the angular rate of movement between said windings, said primary winding being connected to said source of alternating current and said secondary winding being connected to said synchronous motor, and means controlled from said source and effective for each power cessation for causing relative angular movement between said primary and said secondary winding after a power cessation to an extent proportional to the duration of that power cessation.

3. In combination, an electric clock of the self-starting synchronous motor type, a source of alternating current having its frequency regulated to correctly manifest the passing of time, means including a time measuring device operable only during a cessation of said alternating current for measuring the duration of such cessation, means controlled by said time measuring means for causing the frequency applied to the electric clock to be increased to a higher value for a period of time after each current cessation, said increase in frequency and said period of time having a relation to the duration of the current cessation as measured by said time measuring device such that the said clock will after said period of time again indicate correct time except for the error of said time measuring device accumulated during the time of such cessation.

4. In combination, an electric clock of the self-starting synchronous motor type, a source of alternating current of regulated frequency, frequency boosting means, and time measuring means responsive to each cessation of said alternating current and operating only during such cessation for after the cessation controlling said frequency boosting means to cause the frequency applied to the electric clock to be increased to a higher value for a period of time, said increase in frequency in percent being equal to said duration divided by said period of time.

5. In combination; electric clocks of the self-starting synchronous motor type; a source of alternating current of regulated frequency for operating said clocks to indicate correct time so long as no current cessation occurs; and means including time measuring means responsive to each power failure and operating only during such power failure for, after each power failure, adding the correct number of cycles to the alternating current to cause said electric clocks to again indicate correct time; said number of cycles added being equal to the product of the time of failure as measured by said time measuring means in seconds and the frequency in cycles per second of the alternating current.

6. In combination; a rotary transformer consisting of a stator having a rotating magnetic field produced therein by alternating current, a rotor, and a secondary winding contained on said rotor in said rotating magnetic field; time measuring means for measuring the duration of each cessation of said alternating current; means for allowing said time measuring means to operate only during a cessation of current; means controlled by said time measuring means for rotating said rotor to cause said source to induce in said secondary winding an alternating current voltage whose frequency is greater than that of said first named alternating current by an amount proportional to the rotor's angular velocity and for a time proportional to the duration of such current cessation; and self starting synchronous motor electric clocks operated by the alternating current supplied by said secondary winding.

7. In a clock system comprising; one or more self-starting synchronous motor electric clocks; a source of alternating current having its frequency regulated to correctly manifest time; a mechanical clock including means for holding it at rest during the presence of alternating current and for allowing it to run only during a power cessation to integrate the duration of such cessation; and means for, upon the resumption of power, automatically adding the required number of oscillations to the alternating current supplied to said electric clocks to again cause said clocks to indicate substantially the same time as they would have indicated had no power cessation occurred.

8. In an electric clock system; a source of alternating current having its frequency regulated to correctly manifest the passing of time; a local source of energy; time lapse manifesting means operated from said local source of energy; means controlled by said alternating current for preventing operation of said time lapse manifesting means when alternating current is supplied by said system and for permitting operation of said time lapse manifesting means only during cessation of current from said alternating current source; a rotary transformer including a magnetic element provided with a winding to produce a rotating magnetic field from said source of alternating current and another magnetic element provided with a winding and rotatable with respect to said first element and in said rotating magnetic field; means for rotating one of said elements after each alternating current cessation to an extent dependent upon the extent of operation of said time lapse manifesting means during such cessation and in a direction to cause such rotation and the rotation of said magnetic field to be cumulative; and a self-starting synchronous motor electric clock connected to the winding of said second mentioned element.

9. In an electric clock system; a source of alternating current having its frequency regulated to correctly manifest the passing of time; a local source of energy; time lapse manifesting means operated from said local source of energy; means controlled by said alternating current for preventing operation of said time lapse manifesting means except during cessation of current from said alternating current source; self-starting synchronous motor clocks operated from said source of alternating current each clock including a synchronous motor having a rotor; and means governed by said time lapse manifesting means for causing additional rotation of said rotors in accordance with the extent of operation of said time lapse manifesting means.

10. In an electric clock system; a source of alternating current regulated to deliver a predetermined number of cycles of current per unit of time; time lapse manifesting means including a shaft, a main spring for driving said shaft and means for allowing rotation of said shaft and dissipation of energy from said main spring in accordance with the lapse of time; means for preventing operation of said time lapse manifesting means except during cessation of current from said alternating current source; a rotary transformer including a magnetic element provided with a winding to produce a rotating magnetic field from said source of alternating current and another magnetic element provided with a winding and rotatable with respect to said first element and in said rotating magnetic field; means controlled by current from said alternating current source for rewinding said main spring after each alternating current cessation; means for rotating one of said elements after each alternating current cessation to an extent dependent upon the extent of operation of said shaft during such cessation and in a direction opposite to that of said rotating magnetic field; and self-starting synchronous motor electric clocks connected to the winding of said second mentioned element.

11. In combination, a stator, a rotor for said stator, a source of alternating current having its frequency regulated to deliver a predetermined number of cycles per unit of time, means including a winding for producing a rotating magnetic field in said stator from said source of alternating current, a clock, means allowing said clock to operate only during a cessation of alternating current, means responsive after a cessation of alternating current from said source and controlled by said clock for rotating said rotor in a direction opposite to the direction of rotation of said magnetic field upon termination of such cessation to an extent dependent upon the duration of such cessation, and one or more self-starting electric synchronous motor clocks connected to said winding, whereby all of said electric clocks will indicate substantially the same time irrespective of whether or not one or more current cessations occur.

12. In a clock system comprising; self-starting synchronous motor electric clocks; a source of alternating current having its frequency regulated to correctly manifest time; a mechanical clock including means for preventing it from running except during a power cessation to integrate the duration of such cessation; means for, upon the resumption of power, automatically adding the required number of oscillations to the alternating current supplied to said electric clocks to again cause said clocks to indicate correct time; and means associated with each of said electric clocks for indicating when such clock has been supplied with less than the required number of cycles of current.

13. In combination, a stator, a source of alternating current having its frequency regulated to deliver a predetermined number of cycles per unit of time, means for producing a rotating magnetic field in said stator from said source of alternating current, a rotor, a winding on said rotor, an escapement clock, means responsive to a cessation of alternating current from said source and controlled by said clock for rotating said rotor in a direction opposite to the direction of rotation of said magnetic field upon termination of such cessation to an extent dependent upon the duration of such cessation, one or more self-starting electric synchronous motor clocks connected to said winding, and means associated with each of said electric clocks for indicating when such clock is being corrected.

14. In combination, a stator, a source of alternating current having its frequency regulated to deliver a predetermined number of cycles per unit of time, means for producing a rotating magnetic field in said stator from said source of alternating current, a rotor, a winding on said rotor, an escapement clock, means responsive to a cessation of alternating current from said source and controlled by said clock for rotating said rotor in a direction opposite to the direction of rotation of said magnetic field upon termination of such cessation to an extent dependent upon the duration of such cessation, one or more self-starting electric synchronous motor clocks connected to said winding, and means associated with each of said electric clocks for indicating when such clock has received less than the required number of cycles of current and also distinctively indicating when such clock is being corrected.

15. In a time indicating system; the combination of a spring motor; a shaft driven by said motor; mechanical speed governing means both connected to and driven by said shaft to cause said shaft by its rotation to manifest the lapse of time; a source of alternating current having its frequency regulated to correctly manifest lapse of time, means for when alternating current is available preventing operation of said mechanical speed governing means; a rotary transformer including two elements rotatable with respect to each other, one having a coil thereon and the other having a winding energized from said alternating current source to produce a rotating magnetic field, rotating about the same axis that said elemnts are rotatable with respect to each other, and linking with the turns in said coil; an electric winding motor energized from said source for rewinding said spring motor until fully rewound and rotating one of said elements with respect to the other and in a direction so that the rate of flux cutting is at the speed of the rotating magnetic field plus the speed of the rotated element; and self-starting synchronous motor electric clocks connected to said coil; whereby said clocks will be energized by alternating current of the frequency of said source at all times when alternating current is available except when said winding motor is operated and is energized by a higher frequency when said winding motor is operated.

16. In a time indicating system; the combination of a spring motor; a shaft driven by said motor; mechanical speed governing means both connected to and driven by said shaft to cause said shaft by its rotation to manifest the lapse of time; a source of alternating current having its frequency regulated to correctly manifest lapse of time, means responsive to said alternating current for preventing operation of said mechanical speed governing means when current is available but allowing operation thereof during a current cessation; a rotary transformer including two elements rotatable with respect to each other, one having a coil thereon and the other having a winding energized from said alternating current source to produce a rotating magnetic field, rotating about the same axis that said elements are rotatable with respect to each other, and linking with the turns in said coil; an electric winding motor energized from said source for rewinding said spring motor after each current cessation until fully rewound and rotating one of said elements with respect to the other and in a direction so that the rate of flux cutting is at the speed of the rotating magnetic field plus the speed of the rotated element and to an extent to generate additional cycles in said coil the sum of which is substantially equal to the number of cycles which would have been transmitted during such current cessation; and self-starting synchronous motor electric clocks connected to said coil; whereby said clocks will be energized by alternating current of the frequency of said source at all times when alternating current is available except when said winding motor is operated and is energized by a higher frequency when said winding motor is operated to an extent to cause said electric clocks to again indicate substantially the same time as they would have done had no current cessation occurred.

17. In a time indicating system; the combination of a spring motor; a shaft driven by said motor; mechanical speed governing means both connected to and driven by said shaft to cause said shaft by its rotation to manifest the lapse of time; a source of alternating current having its frequency regulated to correctly manifest lapse of time, means for when current is available preventing operation of said mechanical speed governing means but allowing operation thereof during a current cessation; a rotary transformer including two elements rotatable with respect to each other, one having a coil thereon and the other having a winding energized from said alternating current source to produce a rotating magnetic field, rotating about the same axis that said elements are rotatable with respect to each other, and linking with the turns in said coil; an electric winding motor energized from said source for rewinding said spring motor after each current cessation until fully rewound and rotating one of said elements with respect to the other and in a direction so that the rate of flux pole cutting is at the speed of the rotating magnetic field plus the speed of the rotated element and to an extent to generate additional cycles in said coil the sum of which is substantially equal to the number of cycles which would have been transmitted during such current cessation; self-starting synchronous motor electric clocks connected to said coil; whereby said clocks will be energized by alternating current of the frequency of said source at all times when alternating current is available except when said winding motor is operated and is energized by a higher frequency when said winding motor is operated; and means associated with each of said electric clocks for indicating that less than the proper number of cycles have been supplied to such clocks.

18. In a time indicating system; the combination with a time distribution net work having a plurality of self-starting synchronous motor electric clocks connected thereto; a power distribution system supplying alternating current having its frequency regulated to correctly manifest the passing of time; a mechanical clock including a main spring; a winding motor for rewinding said main spring and a gear connected to drive one end of said main spring; means energized by current from said power distribution system for preventing operation of said mechanical clock except during cessation of current from said power distribution system; and means for supplying current of power system frequency to said time distribution net work when current is available from said power distribution system and said winding motor is not operating and for supplying current of a higher frequency to said net work when said winding motor is operating; the various elements being so coordinated that the time of winding, is to the time of current cessation as the normal frequency is to the average of said higher frequency minus the normal frequency.

19. In an electric clock system; a source of alternating current having its frequency regulated to correctly manifest the passing of time; time lapse manifesting means operated from a local source of energy; means controlled by said alternating current for preventing operation of said time lapse manifesting means except during cessation of current from said alternating current source; a synchronous motor driven electric clock including clock hands driven by a self-starting synchronous alternating current motor; and means governed by said time lapse manifesting means for causing additional rotation of said clock hands above that normally caused by said synchronous motor immediately after each power cessation to an extent equal to the duration of such cessation.

20. In a time indicating system; the combination of a spring motor; a shaft driven by said motor; mechanical speed governing means both connected to and driven by said shaft to cause said shaft by its rotation to manifest the lapse of time; a source of alternating current having its frequency regulated to correctly manifest lapse of time, means effective when alternating current is available for preventing operation of said mechanical speed governing means; an electric winding motor energized from said source for rewinding said spring until fully rewound after each cessation of alternating current; a synchronous motor driven electric clock including clock hands driven by a self-starting synchronous alternating current motor energized from said source; and means also driven by said winding motor for causing said clock hands to indicate correct time upon cessation of operation of said winding motor.

21. In a clock system, the combination with a power distribution system having a plurality of feeders and having its frequency regulated to correctly manifest time, self-starting synchronous electric motor clocks operated by alternating current transmitted over one of said feeders, a mechanical clock including means for holding it at rest during the presence of alternating current on said one feeder but allowing it to run during a cessation of alternating current on said one feeder; and means for, upon the resumption of power, automatically increasing the frequency of the alternating current supplied to said clocks to an extent and for a period of time as determined by said mechanical clock to cause said electric clocks to indicate substantially the same time as would be indicated by a synchronous electric clock connected to another of said feeders on which no power cessation has occurred.

22. In an electric clock control system, a source of alternating current of regulated frequency, a plurality of self-starting synchronous motor clocks connected to said source so as to indicate correct standard time while current from said source is uninterrupted, a spring driven clock, electro-magnetic means for allowing said spring driven clock to operate only when there is an interruption in the current from said source, a self-starting winding motor for said spring driven clock, means for connecting said winding motor to said source when said spring driven clock is partly unwound and disconnecting it from said source when said spring driven clock is completely wound, and means governed by said winding motor in accordance with the extent of its operation for effecting operation of said synchronous motor clocks to compensate for their loss of operation during an interruption of current from said source.

23. In a clock system, the combination with a power distribution system having a plurality of feeders and having its frequency regulated to correctly manifest time, self-starting synchronous electric motor clocks operated by alternating current transmitted over one of said feeders, a mechanical clock including a main spring and contact means changed from a normal to an actuated condition upon a cessation of alternating current on said one feeder and changed from its actuated to its normal condition after a time period following the cessation proportional to the duration of such cessation; and means including said contact means for, upon the resumption of power, automatically winding said main spring and increasing the frequency of the alternating current supplied to said clocks to an extent and for a period of time as determined by said contact means to cause said electric clocks to indicate substantially the same time as would be indicated by a synchronous electric clock connected to another of said feeders on which no power cessation has occurred.

24. In an electric clock control system, a source of alternating current of regulated frequency, a plurality of self-starting synchronous motor clocks connected to said source so as to indicate correct standard time while current from said source is uninterrupted, a spring driven clock including a main spring, electro-magnetic means for allowing said main spring to run down only when there is an interruption in the current from said source, a self-starting winding motor for said spring driven clock, means for connecting said winding motor to said source when said spring driven clock is partly unwound and disconnecting it from said source when said spring driven clock is completely wound, and means governed by said winding motor in accordance with the extent of its operation for effecting operation of said synchronous motor clocks to compensate for their loss of operation during an interruption of current from said source.

ROBERT H. DICKE.